(12) United States Patent
Burkhead

(10) Patent No.: US 7,035,715 B1
(45) Date of Patent: Apr. 25, 2006

(54) APPARATUS AND PROCESS FOR DUSTLESS HANDLING OF POWDERED CLAY TO PRODUCE A CLAY/WATER SLURRY

(76) Inventor: Ronnie J. Burkhead, 2345 Oaks Rd., Paducah, KY (US) 42003

( * ) Notice: Subject to any disclaimer, the term of this patent is extended or adjusted under 35 U.S.C. 154(b) by 646 days.

(21) Appl. No.: 10/146,677

(22) Filed: May 15, 2002

(51) Int. Cl.
*G07F 17/00* (2006.01)

(52) U.S. Cl. ............ 700/239; 700/240; 700/285; 700/282; 700/268

(58) Field of Classification Search .......... 700/239, 700/268, 282, 285, 258, 240
See application file for complete search history.

(56) References Cited

U.S. PATENT DOCUMENTS

| | | | | |
|---|---|---|---|---|
| 3,502,119 A | * | 3/1970 | Sweeney | 141/68 |
| 3,828,869 A | * | 8/1974 | Sellers | 177/50 |
| 4,292,930 A | * | 10/1981 | Olsen | 119/51.11 |
| 4,843,579 A | * | 6/1989 | Andrews et al. | 700/305 |
| 4,867,258 A | * | 9/1989 | Narukawa et al. | 177/116 |
| 5,376,280 A | * | 12/1994 | Wilhelm et al. | 210/741 |
| 5,545,338 A | * | 8/1996 | Ginn et al. | 210/791 |
| 5,593,948 A | * | 1/1997 | Lisa et al. | 504/324 |
| 5,632,899 A | | 5/1997 | Petrille, III et al. | |
| 6,056,822 A | * | 5/2000 | Jefferson et al. | 118/683 |
| 6,395,091 B1 | * | 5/2002 | Jefferson et al. | 118/683 |
| 2003/0143324 A1 | * | 7/2003 | Delzer et al. | 427/180 |

* cited by examiner

*Primary Examiner*—Donald Walsh
*Assistant Examiner*—Michael E. Butler
(74) *Attorney, Agent, or Firm*—Lloyd L. Zickert

(57) ABSTRACT

Apparatus and process for producing a clay slurry from raw clay in a substantially dust-free manner including a water-driven vacuum eductor for metering the removal of clay from a super bag container and mixing the clay with a carrier water that also serves as the motive force for the eductor for producing a clay slurry and feeding it to an equalization tank that de-aerates and equalizes the slurry. A bag shaker is provided in the source of clay to assist feeding where needed, and a vacuum breaking valve is provided for the eductor to control the flow of raw clay into the eductor. The bag of clay is suspended from a load cell that continuously delivers a weight signal to a programmable logic controller adjustable to set the rate of clay being fed to the eductor and to activate the bag shaker if the clay flow rate lags the set rate and the vacuum breaker if the clay flow rate exceeds the set rate.

17 Claims, 3 Drawing Sheets

APPARATUS AND PROCESS FOR DUSTLESS HANDLING OF POWDERED CLAY TO PRODUCE A CLAY/WATER SLURRY

This invention relates in general to an apparatus and process for making a mixture of clay and water, and more particularly to an apparatus and process for economically delivering raw clay from a shipping container to an end use point in an essentially dust-free manner.

BACKGROUND OF THE INVENTION

In the early 1980's, zebra mussels invaded inland waters of the United States, ultimately to include the Mississippi River, Ohio River, adjoining river basins, and most areas of the Great Lakes. They were believed to have been imported from Europe in the ballast water of trans-Atlantic tankers. These shellfish, due to their rapid reproduction and growth, adaptability to most U.S. and Canadian waters, and ability to attach and layer on water system intakes and distribution systems, quickly became a major pest to numerous industries which depended on fresh water intake for cooling water, firewater, and other uses.

Heretofore, Betz Laboratories of Trevose, Pa., developed a process for selective elimination of zebra mussel and like multi-invertibrate in the intakes of industrial water systems and power plants. That process utilized a toxicant for killing of the zebra mussels in the form of an amine compound dispersed into the intake water which inhibits the uptake of oxygen by mussels by attaching to their gills, thus suffocating them, and bentonite swelling clay for detoxification of the compound before discharge of the water back into the receiving body of water. One of these amine compounds was alkyldimethylbenzylammonium chloride, commonly referred to as ADBAC.

In the early years of administration of this process, sodium bentonite clay in three forms was used for detoxification, which included powdered raw clay; a pre-made concentrated clay/water slurry; and a processed, granulated version of bentonite. While the powdered, raw clay was by far the least expensive option from a cost standpoint, the extreme dusting characteristics of this talcum powder-like material made it environmentally and aesthetically unacceptable in the environments of the industrial areas where clamicide applications were being administered. The term "raw clay" as used herein refers to sodium bentonite clay in powdered form. Preferably, the particle size of the clay is on the order of 200 mesh. The pre-made slurry was, of course, dust free, but the cost of this product is quite high in comparison to the other two options, about 15 times raw clay, 3 times granulated clay, and it is somewhat difficult to feed, and also to maintain in a homogeneous dispersion. The processed granulated clay was relatively dust free, could be fed by conventional methods, typically screw feeders which dropped the clay directly into the discharge water, or into funnels which delivered the dry product into eductor throats for slurrification. Thus, granulated clay became the product of choice for larger applications.

Through the mid-1990's, Betz had virtually no competition in this niche market, having patent protection on the only accepted non-oxidizing clamicide process available on the market. The only practical alternative to Clam-Trol, the trade name for the ADBAC product, was continuous chlorination for up to thirty days. Mussels sense chlorine in water, and "clam up" for extended periods of time when chlorine is present. The discharge permits of many facilities did not permit such chlorination practices, so the Betz process was the only alternative, and cost was not an issue. However, in the latter half of the decade, other competitive products/programs came into the market, forcing Betz to reduce treatment costs dramatically, thus cutting profit margins to generally unacceptable levels.

A cost comparison of powdered raw clay versus granulated processed clay revealed that the delivered cost of granulated clay is typically about three times the cost of raw clay. The total "cost of goods" for doing a typical Clam-Trol application could be substantially reduced if raw clay could be used in place of the granulated clay as a detoxifying agent. However, the dusting problem with raw clay remained the one major hurdle that previously prevented its widespread use as a detoxifying agent. If dusting could be minimized or eliminated, using a practical, manageable, and cost-effective process, the only roadblock would be removed, and the inexpensive raw clay, chemically and functionally the same as the granulated clay, could replace the more expensive granulated clay.

Water-driven vacuum eductors have been used for years as one of the options for delivering clay into the discharge water for ADBAC detoxification, but granulated clay was augered into open funnels, using variable speed screw or auger feeders to meter the clay before educting the clay into the water to be treated. The typical process would utilize a large, open receiving hopper for the clay, mounted on top of the screw feeder as part of the screw feeder assembly. Clay was transferred through open atmosphere twice, once to dump bags of granulated clay into the hopper, and a second time to transfer clay from the screw outlet into the eductor funnel. This process was somewhat dusty even with granulated clay. Dusting was overwhelming and totally unacceptable if raw powdered clay was used, wherein windage and clay movement/agitation created breathing problems and other safety hazards, as well as unacceptable housekeeping issues.

Powdered raw bentonite clay provides a low-cost alternative to processed granulated clay or concentrated preslurried clay for the detoxification of ADBAC clamicide and similar amine-based clamicides. However, the extreme dusting characteristics of raw clay made it impractical to feed in virtually all industrial and power plant settings where zebra mussel treatments were being administered.

SUMMARY OF THE INVENTION

Prior to the development of the apparatus and process of the invention, there was no practical, inexpensive methodology for feeding powdered raw clay in a dustless fashion. The process described herein provides such an alternative by combining various components into a unique, simple, easily transportable package which ultimately can deliver raw bentonite clay from a large shipping container to the end use point in an essentially dust-free manner.

The apparatus and process of the present invention is automated to produce a desired feed rate of clay by utilizing the most economically available raw clay in an environmentally acceptable and a substantially dust-free manner. The apparatus is easily transportable to a work site where clay is needed and is capable of producing a clay slurry on a commercial scale from super bag containers of clay. The apparatus includes tripod supporting frames that are mobile and movable over a super bag container of about 2000 pounds of clay as a source of raw clay. The frames can easily be disassembled for transport on a truck or trailer, and thereafter reassembled at a feed or work site. A power winch is provided on the frame to lift the bag from the ground and suspend it on a load cell for continually monitoring the weight of the bag. A water-driven vacuum eductor includes: a suction port connected to a line and to a wand that is inserted into the clay through an opening in the bag to withdraw clay from the bag; a water source inlet for motive and carrier water under pressure from a suitable source to drive the eductor by creating the vacuum in the suction port and mixing with the clay to form a slurry; and a discharge port connected to a line for delivering the slurry to an equalization tank. The clay/slurry is then delivered from the equalization tank to the use point. Thus, the eductor withdraws clay from the bag.

A programmable logic controller (PLC) receives a primary input signal from the load cell to monitor the weight of the clay in the super bag, and is set for feeding a given amount of clay in a fixed time increment. The water-driven eductor produces a vacuum at its suction port that is connected to a wand placed in the clay to draw clay from the container and mix the clay with water to deliver the clay slurry to the use point. The slurry includes about ten percent by weight clay, and the water functions as a carrier for the clay, as well as motive power for the eductor. The controller is programmed to monitor the feed rate by sensing the weight of the bag, and in the event the feed rate lags, to energize a bag shaker that is also pre-installed in the bag for applying a shaking movement to the clay, thereby assisting in the feeding of the clay. In the event that the feed exceeds the programmed amount, the controller actuates an eductor vacuum break solenoid to reduce the suction head and flow of clay to the eductor.

The controller measures the clay feed rate by a predetermined time increment process according to the weight measurements. In the event that the clay feed rate is not on schedule as to the selected rate at the end of the first time increment, the controller will energize the bag shaker or vibrator to assist in feeding the clay into the suction line. In the event that the feed rate is not on schedule by the end of the second time interval or time increment, the controller may be set to activate an audio alarm or cue and/or a visual cue to alert the operator that attention to the system is needed.

The equalization tank into which the slurry is fed may be a pressurized tank or a non-pressurized tank. The tank allows the clay slurry concentration to equalize and be de-aerated. The pressurized tank also then automatically forces the slurry through a discharge port on to its final destination. A non-pressurized tank is generally open to atmosphere and may be used where there is a need for nothing more than an intermediate tank for de-aerating and equalizing the slurry prior to feeding the slurry to its point of use.

Thus, the controller is set to provide the desired feed rate and the overall process needs no further attention of the operator unless the feed rate declines or until the contents of the bag have been exhausted.

A second tripod is generally provided which would be maneuvered over a second super bag of clay during the emptying of the first bag of clay, and once the contents in the first bag of clay have been exhausted, a changeover operation to the second bag of clay is quickly accomplished by removing the suction wand and bag shaker from the first bag, installing them in the second bag, and adjusting the controller to receive the weight signal from the second bag setup in order to reduce the downtime of feeding of the clay slurry to the point of use.

It is therefore an object of the present invention to provide a new and improved apparatus and process for economically producing a swelling clay slurry in a dustless manner.

A further object of the present invention is to provide an apparatus for substantially continuously feeding clay to a point of use in a slurry form so that it is nearly instantly activatable once it is received at the use site.

Another object of the present invention is to provide a clay feeder that is automated to control the feed of clay with a water-driven vacuum eductor at a substantially continuous and uniform rate, and to thereafter de-aerate and equalize the slurry.

A further object of the invention is to provide easily transportable equipment to carry out the process of the invention.

Other objects, features and advantages of the invention will be apparent from the following detailed disclosure, taken in conjunction with the accompanying sheets of drawings, wherein like reference numerals refer to like parts.

DESCRIPTION OF THE INVENTION

Figure 1:
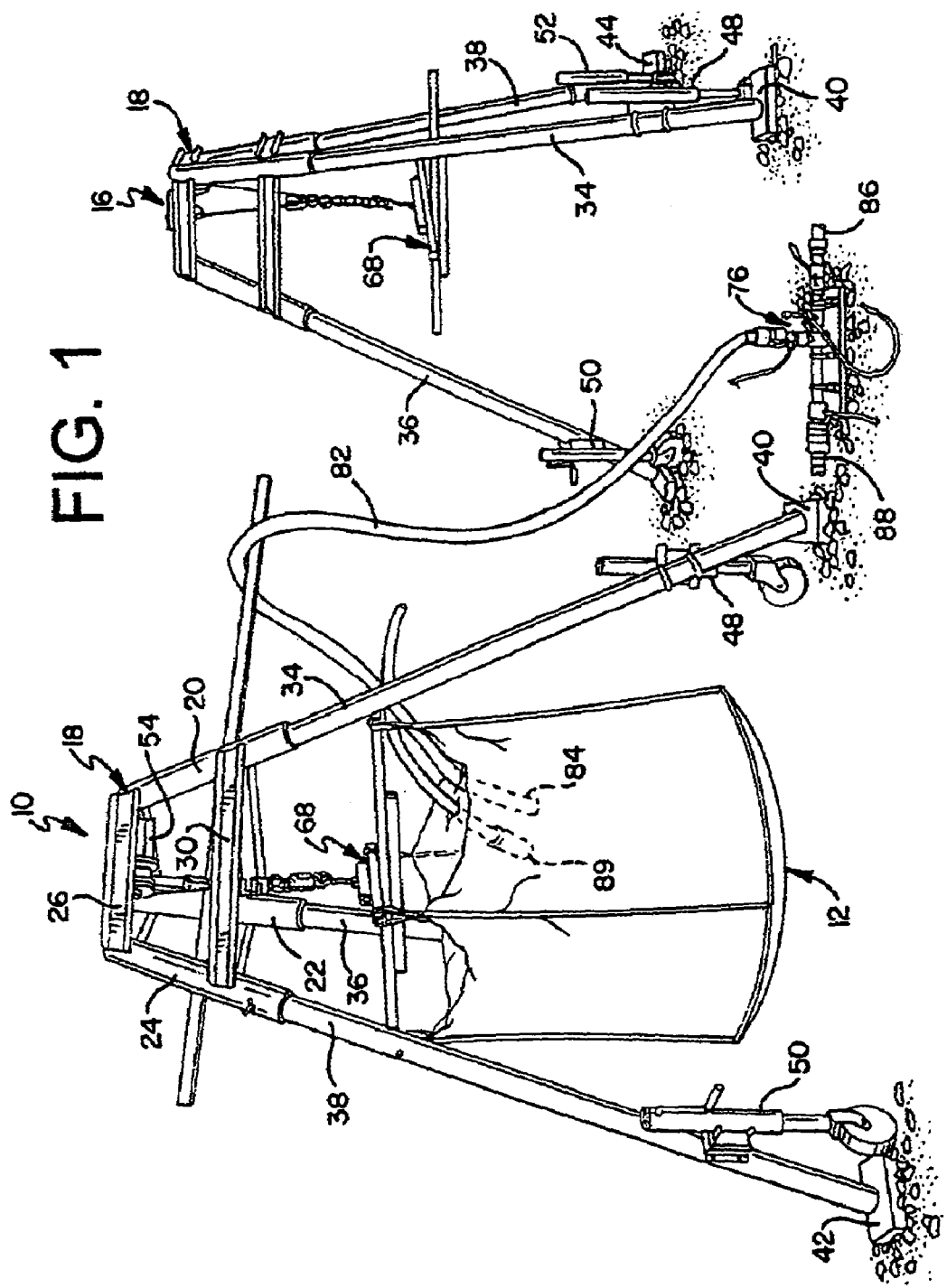
FIG. 1 is a perspective view of a pair of tripod frames for handling super bags of clay and showing one tripod with a bag in suspended relation to the frame and where the contents are connected to a water-driven vacuum eductor by a vacuum line or hose and showing a second frame readied for movement over a second bag of clay.

The apparatus and the process of the present invention utilizes equipment that can be easily transported to a work site and quickly assembled for use once a supply of clay in super bags has been delivered. The bags are arranged in a configuration that facilitates the use of the equipment.

The equipment includes a pair of bag-supporting frames each in the form of a tripod frame, although it should be appreciated that the process of the invention can be carried out with a single tripod frame. The advantage of using the frames is in the ability to ready a second bag of clay for emptying, while the first bag is being emptied, and thereafter allowing a quick changeover to the second bag to continue clay feeding.

Each tripod frame is equipped with an electrically driven winch, a load cell, and a lifting crossbar device, such that once the crossbar lifting device is connected to a bag, the winch lifts the bag from the ground so that the load cell can continuously monitor the weight of the bag. A battery, not shown, provides the power to the winch.

The equipment also includes a water-driven vacuum eductor connected to a line to a wand that is inserted into the bag of clay and to a source of pressurized water functioning to provide a motive force and as a carrier for the clay. A discharge line is connected to the eductor and for feeding the slurry to an equalization tank. A bag shaker is also inserted into the clay in the bag and utilized to assist the feed of the clay when needed. Accordingly, the eductor creates a suction for removing the clay from within the bag that minimizes external dust generation by keeping the dust in the bag. A solenoid operated valve is provided on the eductor for breaking the vacuum when needed for purposes of controlling the flow of clay to the eductor.

A programmable logic controller receives the weight signal from the load cell to continually monitor the weight of the bag for controlling the flow of clay to the eductor. The controller is set up to provide time increments that measure the clay being fed to the eductor through the load cell on the tripod frame for the purpose of activating the bag shaker to assist in the feed of clay to the eductor or to activate the solenoid to break the suction at the eductor and to reduce the flow of clay to the eductor. While any suitable time increment may be used, a fifteen-second increment for delivering ten pounds of clay will provide a clay feed rate of forty pounds per minute. The winch battery or another battery can provide power to the controller.

The discharge of the clay slurry from the eductor is delivered to an equalization tank that de-aerates the slurry and equalizes the concentration of the clay/water mixture or slurry. Thus, the slurry is a mixture of the water and clay accomplished by the eductor, and following the de-aeration and equalizing of the slurry, the slurry is delivered to the point of use.

When the contents of the bag have been depleted, the suction wand is removed from the empty bag and placed in a full bag suspended by a second tripod frame, and the bag shaker is removed from the empty bag and placed in the full bag so that the process can be continued with a minor and insignificant amount of delay. Suitable means is provided on the controller for changing over between the load cell on the first tripod frame to the load cell on the second tripod frame. It will be appreciated that only one tripod frame or any number of frames may be utilized for any project.

Referring now to the drawings, and particularly to FIG. 1, a first tripod frame, generally indicated by the numeral 10, is illustrated as having a super bag of clay 12 in suspension so as to allow the load cell to produce a weight signal for a scale to monitor the weight of the bag. A second tripod frame 16 is shown adjacent the first tripod frame and ready to be moved over a further super bag of clay, thereby in readiness for changing over operation once the contents of the first bag have been depleted.

Both tripod frames 10 and 16 are identical, and accordingly, specific description of one will be made, it being understood that the other is the same. It should further be appreciated that a frame for supporting a super bag of clay may be in some form other than the tripod configuration illustrated for providing the apparatus and process of the invention.

Figure 2:
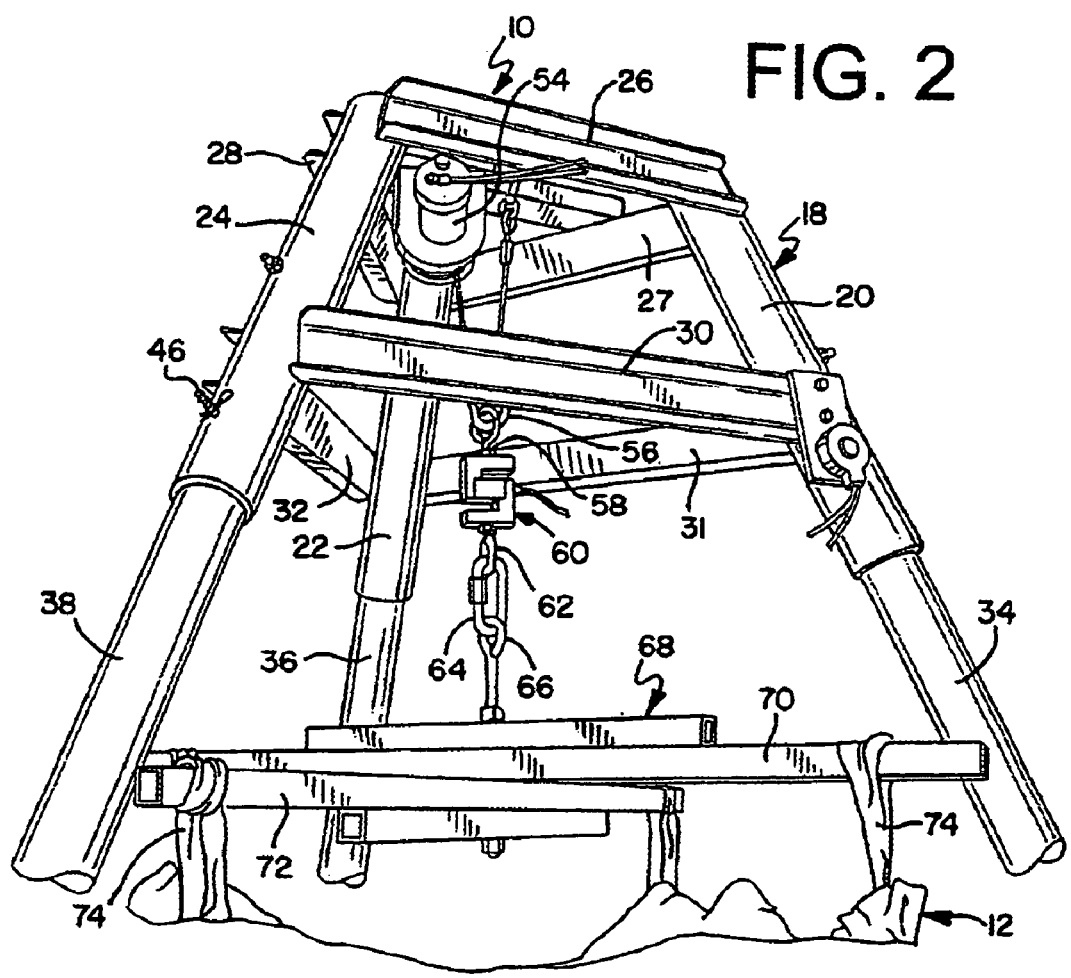
FIG. 2 is an enlarged perspective view of the upper end of a tripod frame showing the winch and lifting cross with a load cell between the winch and the lifting cross for handling a super bag of clay and continuously monitoring the weight of the clay.

The upper part of the tripod frame 10 is further illustrated in FIG. 2 and includes a head 18 having three splayed hollow pipes 20, 22 and 24 interconnected together by upper and lower channel members. The upper channel members are designated as 26, 27 and 28 and the lower channel members are designated as 30, 31 and 32. Each of the hollow pipes 20, 22 and 24 respectively serve as sockets to receive long legs 34, 36 and 38, respectively. The lower ends of the legs may merely engage the ground or floor, or blocks of wood or the like 40, 42 and 44, respectively. The legs are locked in place to the pipes by suitable pin members 46.

At the lower ends of the legs 34, 36 and 38, wheeled dolly jacks 48, 50 and 52 are provided to selectively lift the pads of the legs from the ground and permit the tripod frames to be rolled along the ground for moving over a super bag of clay. Once the frame is in position, the dollies are actuated to lower the legs onto the ground or floor so that the bag of clay can be suspended and weighed.

An electric winch 54 is suitably mounted on the head 18 of the tripod frame and provided with a hook 56 engaging an eyebolt 58 of a Z load cell 60. An eyebolt 62 is provided at the lower end of the load cell for connecting a ring 64, that in turn is connected to an eyebolt 66 joined with a lifting cross 68. The lifting cross includes box-shaped channels 70 and 72 disposed at right angles to each other and onto which supporting loops 74 of the super bag may be placed to connect the lifting cross to the super bag.

Figure 3:
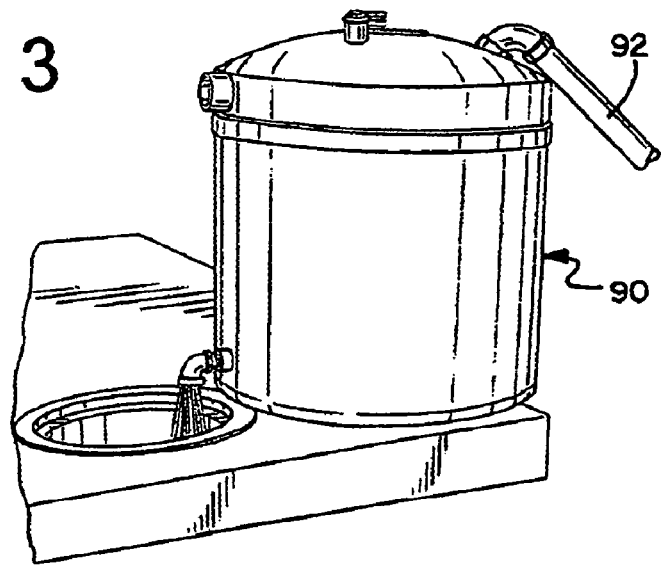
FIG. 3 is a perspective view of an equalization tank for receiving, equalizing and de-aerating the clay slurry before it is delivered to the point of use.
Figure 4:
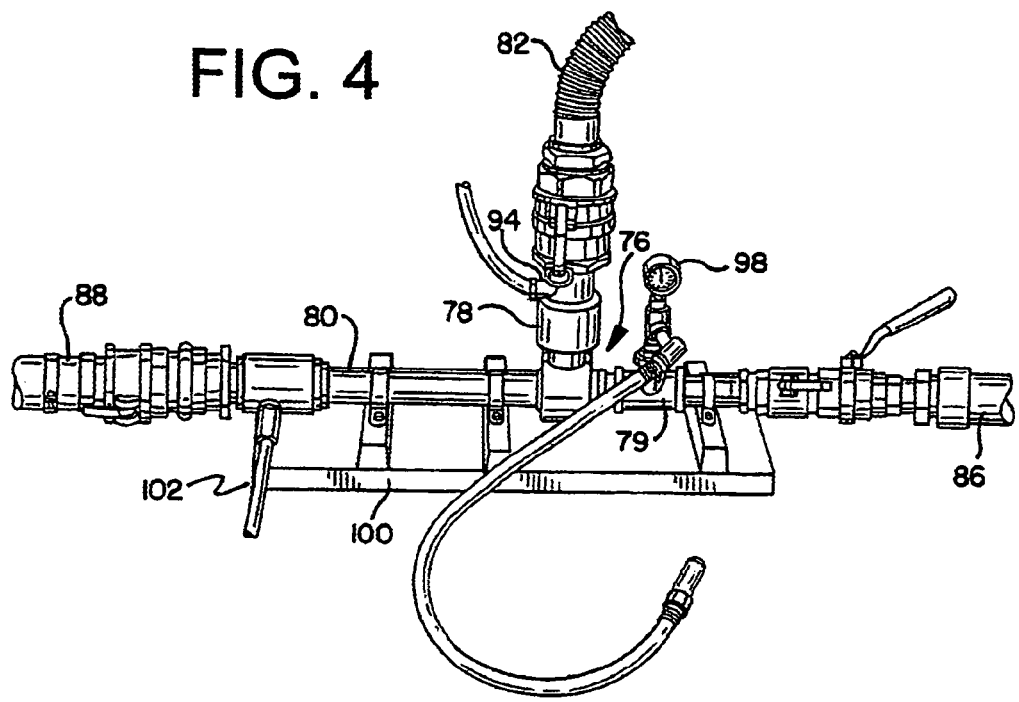
FIG. 4 is an enlarged perspective view of a water-driven vacuum eductor with some parts in fragmentary.
Figure 5:
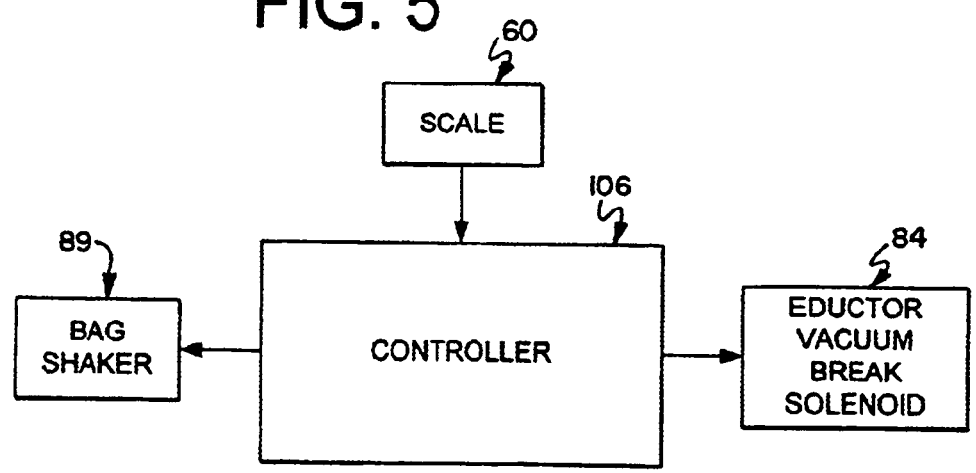
FIG. 5 is a flow diagram of the signals into and out of the controller for controlling the clay feed from the super bag container.

Referring now particularly to FIG. 4, a water-driven vacuum eductor 76 is provided which includes a suction port or connection 78, a water inlet or inlet port or connection 79, and a discharge port or connection 80. The suction port 78 is connected to a suction line or vacuum hose 82 going to a wand 84 that is insertable in the clay in the super bag. A pressurized water line 86 is connected to the inlet port 79 to provide motive water to drive the eductor and which also functions as carrier water for the clay. Water typically supplied by the facility at the work site may be service water or fire water, although it may be supplied by independently pumping fresh water from a lake, stream or other source. A discharge line 88 is connected to the discharge port or connection 80 of the eductor for delivery of the clay slurry to an equalization tank 90 shown in FIG. 3 through a riser 92 which de-aerates and equalizes the clay slurry. A bag shaker 89 is also inserted into the contents of the bag to assist in the feed of clay in the event of bridging or "rat holing" of the clay.

It will be appreciated that the equalization tank may be a pressure tank which builds up its own pressure as it is filled for purposes of expelling the contents, or a non-pressure tank. The pressure tank would have a control valve to relieve the air being de-aerated from the slurry, while the air de-aerating from the slurry in the non-pressure tank would bleed off directly to atmosphere. It should be appreciated that the non-pressure tank also then would be provided with a suitable pumping means for discharging the slurry from the tank and delivering it to a point of use.

A normally closed solenoid operated valve 94 is provided between the suction line 82 and the suction port 78 of the eductor and includes a vacuum breaker line 96 for breaking the vacuum to reduce the flow of clay to the eductor, as will be more fully explained hereinafter. A manually operable valve may be provided for breaking the suction during manual feed if the feeder otherwise malfunctions. A suitable gauge 98 is provided at the water inlet port 79 of the eductor for providing a readout of the water pressure.

The eductor is suitably mounted on a base 100 so that it will be disposed in an upright position, although it should be appreciated that it may be otherwise mounted on the tripod frame or wherever is convenient for handling of the eductor. Optionally, a secondary chemical feed line 102 enables the feed of a further chemical into the clay slurry if desired.

As previously mentioned, in order to control the clay feed rate, a programmable logic controller 106 which includes a suitable display is settable to provide a given clay feed rate. The controller continuously receives a weight signal from the load cell 60 to continually monitor the weight of the bag of clay as clay is removed by the eductor, so as to operate the eductor vacuum break solenoid and the bag shaker as well as an audio and/or visual alarm for the operator. The weight signal is processed by the controller to determine the clay feed rate.

In operation of the apparatus, it will be appreciated that swelling clay is delivered in 2000 pound super bags to the feed or work site which can be indoors or outdoors and set up on varying terrain. As above mentioned, two steel tripod frames are preferably utilized for handling bags of clay. The load cells are suitably connected to the controller and selectively chosen depending on which bag is being used to supply clay to the eductor. The dual tripod frames enable the feeding of clay from one bag, while a second bag is being prepared for feeding to the eductor. A Z-bar load cell is incorporated in the suspension system for the bags, although any suitable load cell may be used to produce a weight signal for the controller.

A pressurized water supply is connected to the eductor to provide the motive force and carrier water for the clay to produce the clay slurry. Depending upon the rate of clay to be fed, the water requirements may vary from 50 to 400 gallons per minute and 40 to 75 psi. The approximate water requirement would be one gpm per pound/minute of clay fed.

Two slits are made in the top of the clay bag so that the suction wand can be inserted through one of the slits and the bag shaker through the second slit. Inasmuch as the clay is drawn from the bag under vacuum, air and dust are pulled inward at the slit openings preventing the escape of clay or clay dust, thereby providing a substantially dust-free environment around the system.

The rate of clay feed is controlled by breaking the vacuum above the suction throat of the eductor through the normally closed solenoid valve to slow down or stop the flow of clay. Closing of the valve resumes or increases the clay feed. The solenoid valve is opened or closed by the controller where the controller is set for the desired feed rate (weight drop rate from the bag). It will be appreciated that the feed rate can be changed at any time and even during the feeding of clay to the eductor in order to respond instantly to any required changes of clay demand by the system. The clay slurry is discharged from the eductor under pressure of about 15 psi and with high shear to the pressure or non-pressure equalization tank. After being de-aerated and equalized in the equalization tank, the clay slurry is delivered to one or more delivery points. It will be appreciated that the equalization tank, whether it be of the pressure or atmospheric type, serves to equalize the concentration of clay going to the final use point and to remove air from the clay slurry to provide a smoother flow of slurry and a lower transport viscosity.

It will be appreciated that if multiple use points are involved, each point will have a specific demand for clay depending on the water flow at that point and the concentration of biocide in the water. The total clay feed rate is determined by summing the individual demands of each delivery point whereby that clay demand is fed from the eductor as set by the controller. Individual flow rates to each delivery point may be determined by measuring and controlling the respective flows of clay slurry to each point by use of flow meters and the like and the flows are maintained in the correct ratios to give the desired rates.

Once a super bag has been depleted of its clay, and the feed wand and vibrator are moved to a second tripod frame and bag set up for continuation of the feed process, the empty bag is removed from the tripod frame, then the wheels of the tripod frame are lowered so that the tripod frame may be rolled into position over another full bag of clay to continue the clay feed process. Then the wheels are retracted to ground the frame so that the bag can be lifted to activate the load cell.

It will be appreciated that water pressure and flow rate for an eductor may be controlled by throttling valves in the line ahead of the eductor to thereby control the total volume of slurry flow generated at rates manageable by the downstream components and use sites.

The bag shaker is actuated by the controller when the feed rate is not at the desired level. The bag shaker is typically needed only when surface tension between clay particles causes bridging that affects the feed rate. As above noted, an audible and/or visible alarm is activated by the controller to alert the operator to any problems caused by the low feed of clay.

It will be understood that modifications and variations may be effected without departing from the scope of the novel concepts of the present invention, but it is understood that this application is to be limited only by the scope of the appended claims.

The invention claimed is:

1. Apparatus for producing a clay slurry from a super bag of raw clay in a substantially dust-free manner, comprising:
   a water-driven vacuum eductor having an inlet port adapted to be connected to a source of pressurized water, a suction port, and a discharge port,
   means for breaking the suction at the suction port,
   a frame including a head supported by a plurality of legs sized so that the frame can support a super bag of raw clay such that its weight may be continuously monitored,
   said frame including a winch with a lifting device for lifting and suspending the super bag of clay,
   a load cell coaching with the winch and lifting device for continually monitoring the weight of the clay,
   a clay feed line connected to said suction port of the eductor and extending into the clay in the bag,
   a bag shaker in said clay,
   and a programmable logic controller for controlling the feed rate of the clay,
   said controller having an input for receiving a weight signal from said load cell, an output for controlling the means for breaking the suction, and an output for controlling the bag shaker,
   whereby the controller after being set controls the feed rate of the clay to the eductor at a substantially uniform feed rate to continuously provide said clay slurry to an end use point.

2. The apparatus of claim 1, wherein the legs of the frame are selectively removable to enhance the transportability of the frame.

3. The apparatus of claim 1, which further includes wheeled dolly jacks at the lower ends of the legs for selectively grounding the legs or lifting the legs to facilitate the mobility of the frame.

4. The apparatus of claim 1, wherein the frame is in the form of a tripod.

5. The apparatus of claim 1, wherein the winch is powered by a motor.

6. The apparatus of claim 1, wherein the frame is in the form of a tripod having selectively removable legs to enhance the transportability of the frame and wheeled dolly jacks for selectively placing the frame on wheels or grounding the frame for supporting a super bag.

7. The apparatus of claim 1, which further includes an equalization tank connected to the discharge port of the eductor for de-aerating and equalizing the flow of clay slurry.

8. The apparatus of claim 7, wherein the equalization tank is a pressure tank having a control valve for bleeding air.

9. The apparatus of claim 7, wherein the equalization tank is non-pressurized.

10. A process for substantially dustless handling of powdered raw clay in the production of a clay slurry comprising the steps of:
supporting a super bag of clay so that the contents can be continuously weighed,
continuously weighing the bag of clay
producing a weight signal,
sending the signal to a programmable logic controller,
withdrawing clay from the bag under the power of a vacuum in a dust-free manner,
delivering the clay to a water-driven vacuum eductor,
feeding pressurized water to the eductor,
mixing the water and clay in the eductor to form a clay slurry,
continuously controlling the rate of raw clay fed to the eductor such that the raw clay is fed at a predetermined feed rate,
discharging the slurry from the eductor,
de-aerating the slurry,
equalizing the slurry, and
continuously feeding the slurry to a use site.

11. The process of claim 10, which further includes time incrementally weighing the clay in the bag to control the rate of feed,
setting a feed rate at the controller,
breaking the vacuum to the eductor in the event that the feed rate exceeds the set feed rate,
applying a shaking action to the clay in the bag in the event the feed rate lags the set feed rate.

12. The process of continuously making and feeding a clay slurry in a substantially dust-free manner to an end use point for detoxifying water treated with an amine compound to control zebra mussels or the like which comprises the steps of:
providing raw clay in a super bag,
providing a water-driven vacuum eductor having an inlet port connected to a pressurized water supply that functions as motive power for the eductor and a carrier for the clay, a suction port connected to a line going into the clay, and a discharge port for discharging the clay slurry,
providing means for breaking the vacuum at the suction port,
controlling the rate of clay feed to the eductor by continuously measuring the weight of the clay in the bag, and operating the vacuum breaking means for adjusting the vacuum in the suction port,
and de-aerating and equalizing the clay slurry.

13. The process of making a clay slurry in a substantially dust-free manner for detoxifying water treated with an amine compound to control zebra mussels or the like which comprises the steps of:
providing raw clay in a super bag,
moving a lifting device having an integral load cell over the bag,
connecting the bag to the lift device,
operating the lifting device to suspend the bag and activate the load cell, wherein the load cell produces a weight signal,
producing vacuum power with a water-driven vacuum eductor by connecting the eductor to a pressurized water source, whereby the pressurized water provides a motive force for the eductor and a carrier for the clay,
continuously removing clay from the bag to the eductor under the vacuum power of the eductor and mixing it with the water from the pressurized water source to form a clay slurry,
providing a vacuum breaker on the eductor,
providing a bag shaker in the clay to assist feeding of the clay to the eductor,
feeding the clay slurry to an equalization tank,
de-aerating and equalizing the clay slurry in the tank and delivering the slurry from the tank to a point of use, and
controlling the rate of clay fed to the eductor with a programmable logic controller, wherein the controller includes or is connected to an alarm,
feeding the weight signal to the controller,
setting the controller to a desired clay feed rate,
processing the weight signal in time increments,
programming the controller to actuate the bag shaker if the feed rate lags the set rate for one time increment, to actuate the vacuum breaker if the feed rate exceeds the set rate, and to actuate the alarm if the feed rate lags the set rate for more than one time increment.

14. Apparatus for producing a clay slurry from a super bag of raw clay and a source of water in a substantially dust-free manner and delivering the slurry to a delivery line going to an end use point, comprising:
a water-driven vacuum eductor for withdrawing clay from said super bag of raw clay and mixing the raw clay with water to produce said slurry, said eductor having an inlet port, a suction port, and a discharge port,
means connecting said inlet port to a source of pressurized water,
means connecting said suction port of the eductor to a clay feed line extending into the clay in the super bag,
means connecting said discharge port to said delivery line,
means for supporting said super bag of raw clay so that its weight can be continually monitored,
weighing means coacting with said supporting means for continually monitoring the weight of the clay in said super bag and for substantially continually producing a weight signal,
means for selectively breaking the suction at the suction port of said eductor for controlling the rate of feed of raw clay to said eductor to establish a predetermined feed rate,
and a programmable logic controller for controlling operation of said suction breaking mean to establish the feed rate of the clay to said eductor,
said controller having an input connected to said weighing means for receiving said weight signal reflecting the weight of raw clay in said super bag, means for setting a predetermined feed rate of raw clay, and an output for delivering a signal to said suction breaking means to maintain said predetermined feed rate of raw clay to said eductor,
whereby the controller after being set for a predetermined feed rate functions to selectively trigger said suction breaking means and maintain the predetermined feed rate of raw clay to the eductor to continuously provide a slurry flow to said delivery line and end use point.

15. The apparatus of claim 14, which further includes means for agitating the clay in said super bag to promote withdrawal of clay therefrom.

16. The apparatus of claim 15, wherein said agitating means is selectively operated in response to said predetermined feed rate.

17. The apparatus of claim 16, wherein said agitating means is controlled by said programmable logic controller.

* * * * *